Dec. 8, 1964     O. A. GOULDEN     3,160,220

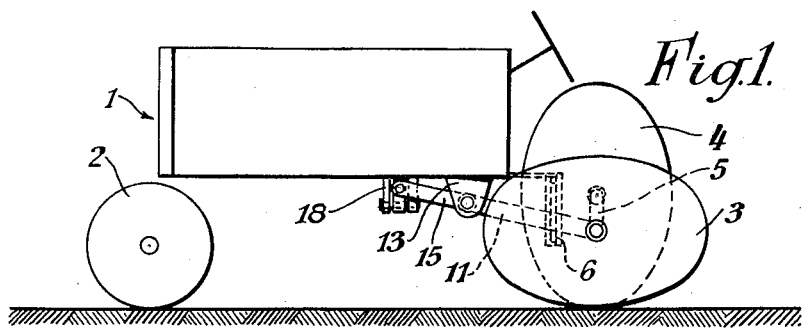
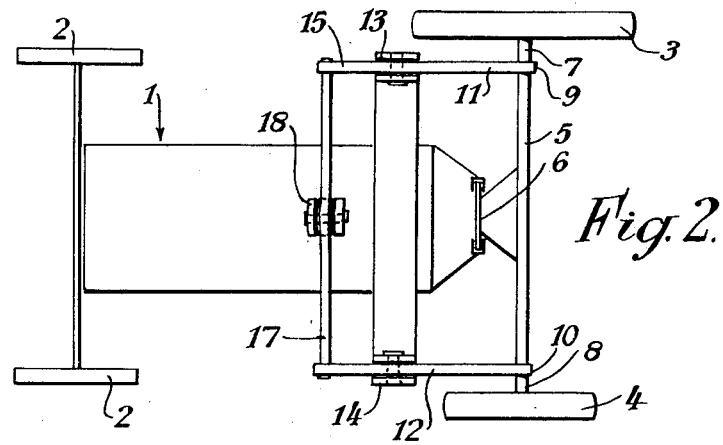
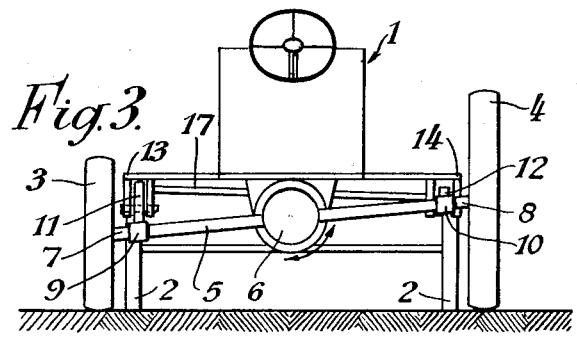

VEHICLE TRANSMISSION

Filed Oct. 2, 1961     3 Sheets-Sheet 2

INVENTOR
OSMUND A. GOULDEN
BY
ATTORNEY

Dec. 8, 1964     O. A. GOULDEN     3,160,220
VEHICLE TRANSMISSION

Filed Oct. 2, 1961     3 Sheets-Sheet 3

INVENTOR
OSMUND A. GOULDEN
BY
ATTORNEY

United States Patent Office 3,160,220
Patented Dec. 8, 1964

3,160,220
VEHICLE TRANSMISSION
Osmund Anthony Goulden, Woodend, Woodsland Drive,
Sunbury-on-Thames, England
Filed Oct. 2, 1961, Ser. No. 142,283
Claims priority, application Great Britain, Oct. 7, 1960,
34,531/60
3 Claims. (Cl. 180—7)

The present invention relates to improvements in vehicle transmissions and is more particularly concerned with final drives for cross-country vehicles which will give greatly increased tractive effort compared with final drives employing tyres and wheels of the conventional circular shape.

According to the present invention a final drive for a vehicle comprises at least one pair of substantially elliptically shaped tyres on two driving road-wheels, said two driving wheels being positioned one on each side of said vehicle opposite one another and connected to the chassis or the like thereof by suspension means so constructed as to ensure level motion of said vehicle when said road-wheels are rotating in driving it.

How the invention may be carried out will now be particularly described by way of example only and with reference to the accompanying drawings in which:

FIGURE 1 shows schematically and in side elevation the application of a transmission final drive according to the invention to an agricultural tractor;

FIGURE 2 is a schematic underside plan view of FIGURE 1;

FIGURE 3 is an end elevation of FIGURE 1;

FIGURES 5 and 6 show another embodiment of the invention as applied to a six wheeled truck or the like;

FIGURE 7 shows schematically and in perspective the application of the invention to a four-wheel, four-wheel-drive truck or the like.

Figure 4:
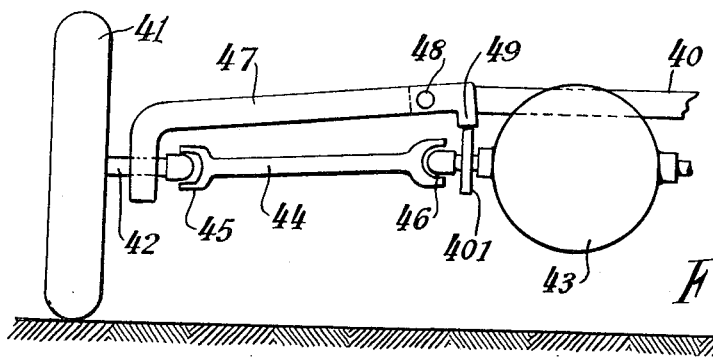
FIGURE 4 shows an alternative arrangement of the suspension means for the driving wheels of the tractor of FIGURES 1 and 2.

Referring to FIGURES 1, 2 and 3 a tractor 1 has a conventional pair of front steerable wheels 2 but is provided at its rear with a pair of elliptically shaped wheels and tyres 3, 4. Alternatively the rear wheels may be circular with elliptical tyres thereon the inner periphery of the tyres being circular. The two elliptical wheels 3, 4 are mounted on a common axle 5 so that they are 90° out of phase with one another, the rigid axle 5, with no differential, ensuring that they are always 90° out of phase when driving the tractor, the drive shaft from the engine not being shown. The centre of the axle 5 is pivotally mounted at 6 to the tractor chassis so that the axle 5 is free to pivot in a vertical plane transversely with respect to the tractor. The ends 7 and 8 of the axle 5 are suspended on one of the ends 9, 10 of two lever arms 11, 12 which are pivoted on the ends of fulcrum members 13, 14 extending transversely and outwardly from the tractor chassis, so that the lever arms can pivot in a vertical plane longitudinally with respect to the tractor. The other ends 15, 16 of the two lever arms 11, 12 are pivotally connected to the ends of a transverse lever arm 17 which is pivoted at its mid-point to the underside of the tractor chassis at 18. The arrangement of lever arms 11, 12 and 17 ensures that although the ends 9, 10 of the lever arms 11, 12 move vertically up and down because of the ellipticity of the wheels 3, 4, the suspension points 6, 13, 14 and 18 do not move vertically with respect to the ground and consequently the tractor travels in a level path without any pitching or rolling.

The final drive arrangement shown in FIGURES 1, 2 and 3 illustrates the simplest form of the invention in which only one pair of elliptical wheels is used and in which there is no differential mechanism operating between the two wheels.

Other final drive arrangements employing a plurality of pairs of elliptical wheels and also employing means for obtaining differential action between opposite elliptical wheels will now be described.

FIGURE 4 shows schematically a suspension arrangement for the driving wheels of a two wheel drive tractor which replaces that of FIGS. 1–3 and in which a conventional differential gear is incorporated.

A fulcrum bar 40 is secured horizontally to the tractor chassis. Each wheel 41 is mounted on a stub axle 42 which is connected to the differential 43 by a half-shaft 44 which is universally coupled at 45 and 46 to stub axle 42 and differential 43 respectively. The stub axle 42 is connected by a lever arm 47 to one end of the fulcrum bar 40 to which it is pivoted at 48. This end of the lever arm has a depending end portion 49 which bears against an elliptical cam 401 having the same eccentricity as the elliptical wheel 41 but being 90° out of phase therewith.

The purpose of the cam 401 is to compensate for the ellipticity of the wheel 41 in order to ensure that the fulcrum bar 40, and consequently the tractor chassis, is not made to move up and down relative to the ground as the elliptical wheel 41 rotates. If no elliptical cam 401 were provided then the stub axle 42 would rise or fall relative to the fulcrum bar 40 as the elliptical wheel had the end of its minor or major axis touching the road respectively thereby causing the fulcrum bar to move down or up with respect to the ground. However since the elliptical cam has the same eccentricity as the elliptical wheel 41 and is 90° out of phase therewith and the lever arm 47 is pivoted to have the required mechanical advantage, the tendency of the stub axle 42 to drop or rise relative to the fulcrum bar 40 is compensated for by the cam 401 either bearing against the portion 49 of the lever arm 47 and pushing the stub axle down relative to the fulcrum bar 40 or allowing the stub axle to rise relative to the fulcrum bar 40 thus preventing the fulcrum from rising or falling relative to the ground. By setting the fulcrum bar 40 at a suitable angle to the chassis it is possible to ensure that the tractor stays on an even keel and does not keel over when being driven with one wheel in a furrow or when being driven along a steep hillside. This makes the tractor safer to drive as it will not overturn and it also makes the driver's ride more comfortable.

Figure 5:
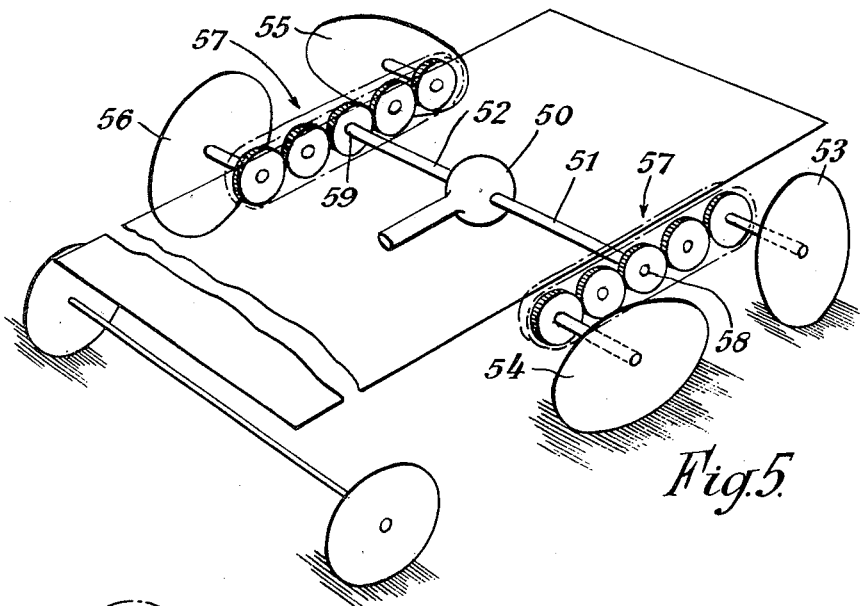
Figure 6:
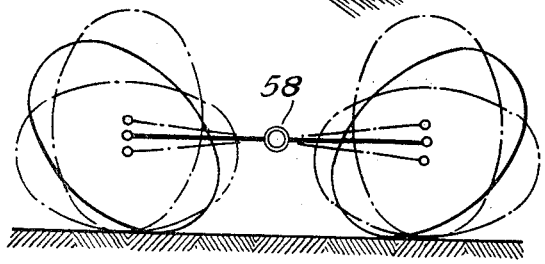

Referring to FIGURE 5, this shows schematically another embodiment of the invention in which a six wheel vehicle, such as a heavy truck, has its four rear driving wheels of the same elliptical shape. The rear axle driving arrangement is a well known arrangement comprising a single differential 50 which drives two half shafts 51, 52 which in turn each drives a pair of wheels 53, 54 and 55, 56 through gear trains 57. Each one of the pairs of elliptical wheels 53, 54, and 55, 56 is 90° out of phase with the other one of the pair and they stay this way since each pair is driven from a common half-shaft through gearing. Therefore when the vehicle is moving the half-shaft does not move up and down relative to the ground although the line joining the points of suspension of the two wheels pivots about this axis due to the rise and fall of the said points of suspension as the elliptical wheel rotates, as shown diagrammatically in FIGURE 6. Therefore providing each one of the pairs of elliptical wheels 53, 54 and 55, 56 is 90° out of phase with the other one of the pair the two points 58, 59 will not move up and down relative to the ground and therefore there can be differential action between these two pairs of wheels. Consequently an ordinary truck having a normal four wheel drive rear bogie of the kind described can be converted to having a final drive according to the invention by simply replacing its four rear circular wheels and tyres by elliptical wheels and tyres or more simply by replacing only its circular tyres by tyres having elliptically shaped treads.

Figure 7:
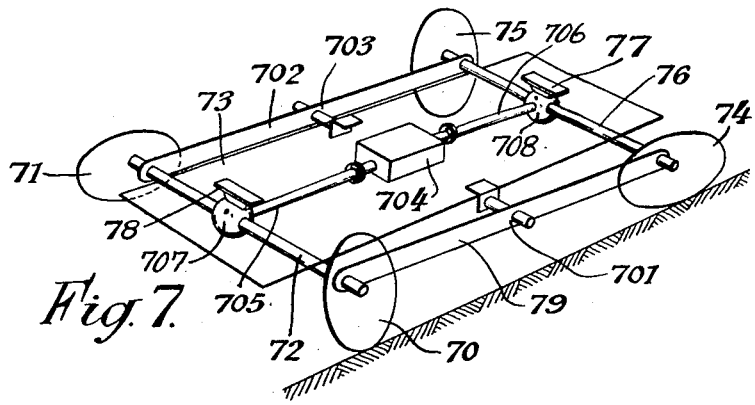

An embodiment of the invention will now be described with reference to FIGURE 7 which shows schematically a four-wheeled four-wheel-drive vehicle having each of its wheels of elliptical shape. The front two wheels 70, 71 are mounted on the ends of a common axle 72 so that they are 90° out of phase with one another, the centre of the axle 72 being pivotally connected at 78 for movement in a vertical plane to the chassis 73. The rear two wheels 74, 75 are similarly mounted on the ends of a common axle 76 pivoted to the chassis at 77, so that they are 90° out of phase with one another and so that wheels on the same side of the chassis are also 90° out of phase. The ends of the axles 72, 76 near the wheels 70, 74 are connected by an arm 79 which is pivoted to the chassis at 701 so that it can oscillate in a vertical plane. A similar arm 702 connects the ends of the axles near the wheels 71, 75 and is pivoted at 703 to the chassis 73. The two pairs of wheels 70, 71 and 74, 75 are driven from a motor 704 through two drive shafts 705, 706 at the same speed so that wheels 71, 75 and 70, 74 remain 90° out of phase with each other. The shafts 705 and 706 are connected to the axles 72 and 76 respectively through bevel boxes 707 and 708. With this arrangement the chassis 73 will proceed in normal level motion without any pitching or rolling when the elliptical driving wheels rotate. Since it is essential for level motion that the four wheels should be 90° out of phase in the manner described, at all times, it is not possible in this arrangement to employ two conventional differentials between the two front wheels and between the two back wheels. There are however various ways according to the invention of providing the required amount of differential action between the wheels of each pair without allowing the elliptical wheels to rotate out of their 90° out of phase relationship with one another.

Figure 9:
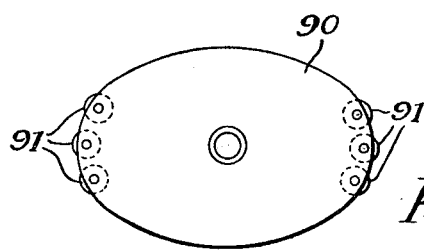
FIGURE 9 shows diagrammatically an elliptical wheel having means for providing differential action between two such wheels.

The preferred arrangement as shown in FIGURE 9, for providing differential action between two opposite wheels comprises providing each elliptical wheel 90 with one or more small circular freely rotatable wheels 91 mounted at each end of the major axis of the ellipse and preferably within the elliptical profile so that only a small portion of their periphery or peripheries projects or project to form a small part of the profile of the ellipse. It will be seen that with this arrangement, at any time, one wheel is running on the minor axis part of the ellipse surface, which is fixed relative to the axle, and the opposite wheel, since it is 90° out of phase with said first wheel, is running on said small wheels which rotate relative to said elliptical wheel thereby providing differential action and positive drive at all times. This differential arrangement may also be employed with the tractor final drive arrangement shown in FIGURES 1 and 2.

The reasons for a final drive employing elliptical wheels arranged as described above providing better traction than a conventional final drive employing circular wheels, particularly in soft penetrable ground, are as follows.

When a circular driving wheel starts spinning on soft ground, such as mud, it gradually cuts a groove in the ground into which it sinks, the mud being built up on each end of the groove round the buried portion of the wheel. Since the groove is the same size as the wheel, the wheel is prevented from moving forward or back even if it subsequently does grip the ground at the base of the groove.

An elliptical driving wheel is less likely to spin on soft ground such as mud for the following reasons. A wheel of elliptical shape can, for the purposes of this explanation, be considered analogous to a circular wheel having a pair of projections situated on its periphery diametrically opposite one another. When such a driving wheel is rotating on the surface of soft ground, such as mud, the "projecting" parts of the elliptical wheel, i.e. those parts in the vicinity of the ends of the major axis, dig into the ground and the wheel then acts in a manner analogous to a lever having one end retained and acting as the fulcrum. By this "lever action" the elliptical driving wheels of the final drive arrangements described are able to provide traction over penetrable ground where final drives employing conventional circular wheels would provide none at all.

Should the elliptical wheel however start to spin it still has the following advantages over a circular wheel.

Since the point of contact of the elliptical wheel with the ground moves with simple harmonic motion in a straight line, when the wheel is stationary, as opposed to a circular wheel where the point of contact is stationary; the groove cut by the spinning elliptical wheel in the soft-ground is in the form of a trench the ends of which do not confine the wheel, as in the case of a circular wheel, thereby enabling some hard material to be inserted on the base of the groove and allowing room for the elliptical wheel to get a grip on this hard material and drive itself out of the groove. Another advantage of the final drive arrangements described above is the fact that the axle joining a pair of opposite elliptical wheels oscillates in a vertical plane about a central pivot when the two wheels are being driven. It is therefore possible to extract the spinning wheels from soft ground by inserting planks for example under one half of the axle when it is in its high position and then driving the two wheels thus causing the axle to bear down on said planking and jack the elliptical wheel out of the said groove.

Whereas the advantage of final drives employing elliptical wheels over those employing circular wheels as far as soft ground is concerned is that elliptical wheels can provide traction where circular wheels can provide none at all, final drives employing elliptical wheels also have a considerable advantage over circular wheels as far as tractive effort produced is concerned, on hard impenetrable ground the following experimental results being an indication of the tractive advantage obtained.

Figure 8:
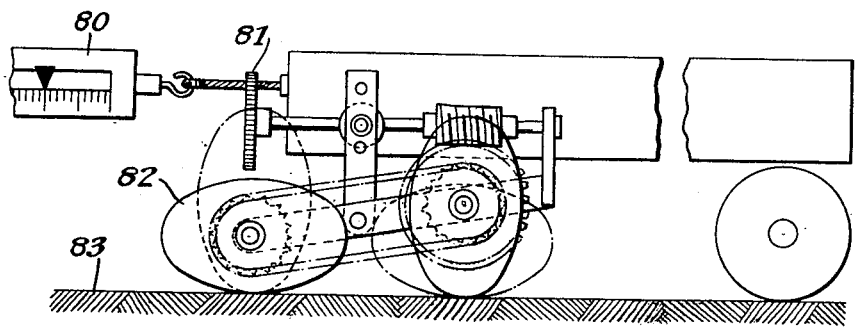
FIGURE 8 shows a model used to determine experimentally the advantage of a final drive employing elliptical wheels over one employing conventional circular wheels.

The experiment was carried out using a model having a final drive arrangement as shown in FIGURE 8. The vehicle was anchored at its rear to a spring balance 80 and power was applied to the four driving wheels 82 of the model by hand rotation of the wheel 81. The model was placed on different surfaces and the wheel 81 rotated until the elliptical wheels 82 span, the reading of the spring balance 80 being taken while the elliptical wheels 82 were spinning to give a measurement of the tractive effort exerted by the elliptical wheels 82 on the supporting surface 83. The elliptical wheels 82 were then changed for circular wheels and the experiment repeated. The following results were obtained using wheels having an eccentricity of 3:5.

Table I

| Test Surface | Equivalent Surface | Percentage Advantage of Tractive Effort of Elliptical Over Circular Wheels |
|---|---|---|
| Oiled Glass | Wet Ice | 50 |
| Glass | Ice | 40 |
| Polished Wood | Rough Ice | 35 |
| Unpolished Wood | Tar Macadam | 30 |

As can be seen from the above results the superiority of a final drive employing elliptical wheels increases as the coefficient of friction between the tyre and supporting surface decreases. Greater advantage may be obtained by employing elliptical wheels of greater eccentricity. A similar arrangement employing two sets of bogies having four wheels, of the kind shown in FIGURE 5, may be employed on railway locomotives either with or without differentials, the tractive advantage of such an arrangement being the same as that described with reference to vehicles with elliptical final drive travelling over hard ground.

An indication of the increase obtained in tractive effort over soft penetrable ground when employing a final drive with elliptical wheels as compared with a final drive employing circular wheels and tyres is given in the Table II below.

*Table II*

| Percentage Loaded | Percentage Increase in Tractive Effort Over Circular Wheels and Tyres |
|---|---|
| 0 | 15 |
| 20 | 22½ |
| 40 | 32 |
| 60 | 55 |
| 80 | 100 |

With a four-wheel four-wheel-drive vehicle as described with reference to FIGURE 7 for example, the percentage increase in tractive effort, given in the right hand column of Table II should each be increased by 100%.

The four wheel, four-wheel-drive arrangement described with reference to FIGURE 7 has the following additional advantages over a similar four-wheel-drive arrangement using circular wheels.

Because of the elimination of the conventional differential, four-wheel-drive is maintained at all times as opposed to a drive employing circular wheels in which four-wheel-drive can be lost by at least one wheel spinning in mud or the like. The conventional differentials are dispensed with, and the weight of a vehicle for delivering a particular tractive effort can be reduced substantially. Smaller wheels may be fitted, in order to obtain the same tractive effort as a drive employing circular wheels, hence allowing higher driving shaft speeds, with a consequent saving in reduction gearing and in the weight of the transmission. The vehicle may therefore also be made with lower axles and consequently with a lower centre of gravity thus providing greater stability and greater flotation.

What I claim is:

1. In a vehicle having a chassis, a final drive comprising four driving wheels, said driving wheels each having an elliptically shaped outer periphery, a first axle, first and second of said driving wheels mounted 90° out of phase with one another on opposite ends of said first axle, a second axle, third and fourth of said driving wheels mounted 90° out of phase with one another on opposite ends of said second axle, a first pivot member mounted intermediately on one side of said chassis, a first lever arm, the mid-point of said first lever arm being pivotally mounted on said first pivot and having its two ends pivotally connected to the ends of said first and second axles adjacent said first and third wheels respectively, a second pivot member mounted intermediately on the other side of said chassis, a second lever arm, the mid-point of said second lever arm being pivotally mounted on said second pivot and having its two ends pivotally connected to the ends of said first and second axles adjacent said second and fourth wheels respectively, said first and third wheels and second and fourth wheels being mounted 90° out of phase with one another, said first and second axles being pivotally mounted at their mid-points to said chassis, a power source, transmission means, said transmission means drivably connecting said power source to said first and second axles to rotate said wheels at a constant speed of rotation during each revolution.

2. A final drive as claimed in claim 1 including at least eight small circular wheels, each of said elliptical driving wheels having at least one of said small circular wheels rotatably mounted in the periphery thereof in each of the two regions at the ends of the major axis thereof, said small circular wheels projecting slightly from said periphery, whereby when any one of said driving wheels has either of said two regions near the ground the driving wheel will rest on said small circular wheel and will not produce any tractive force to provide differential action between said first and second driving wheels and between said third and fourth driving wheels.

3. In an automobile wheeled vehicle, at least one pair of substantially elliptical wheels of substantially equal perimetral dimensions, means interconnected said wheels for the driving thereof at substantially constant angular velocity when the vehicle is running straight and at uniform speed, mounting means for the rotatable mounting of each such wheel to the vehicle spaced trackwise by a distance approximating to the width of the vehicle, said mounting means including means for constraining the elliptical center of each said wheel to rise and fall relatively to the vehicle when the vehicle runs on a level surface so that the vehicle runs level parallel to said surface, and at least four small circular wheels, each of said elliptical wheels having at least one of said small circular wheels rotatably mounted in the periphery thereof in each of the two regions at the ends of the major axis thereof, said small circular wheels projecting slightly from said periphery, whereby when any one of said elliptical wheels has either of said two regions near the ground the elliptical wheel will rest on said small circular wheel and will not produce any tractive force to provide differential action between the elliptical wheels of said pair.

References Cited by the Examiner

UNITED STATES PATENTS

| 2,256,570 | 9/41 | Kopczynski | 180—7 |
| 2,711,221 | 6/55 | Kopczynski | 180—7 X |
| 2,819,767 | 1/58 | Kopszynski | 180—7 |

A. HARRY LEVY, *Primary Examiner.*

LEO FRIAGLIA, *Examiner.*